(12) United States Patent
Oprea et al.

(10) Patent No.: US 9,436,450 B2
(45) Date of Patent: Sep. 6, 2016

(54) METHOD AND APPARATUS FOR OPTIMISING COMPUTER PROGRAM CODE

(71) Applicants: Mihai Daniel Oprea, Bucharest (RO); Ciprian Arbone, Onesti (RO); Bogdan Florin Ditu, Ploiest (RO)

(72) Inventors: Mihai Daniel Oprea, Bucharest (RO); Ciprian Arbone, Onesti (RO); Bogdan Florin Ditu, Ploiest (RO)

(73) Assignee: FREESCALE SEMICONDUCTOR, INC., Austin, TX (US)

( * ) Notice: Subject to any disclaimer, the term of this patent is extended or adjusted under 35 U.S.C. 154(b) by 0 days.

(21) Appl. No.: 14/531,024

(22) Filed: Nov. 3, 2014

(65) Prior Publication Data
US 2016/0062751 A1     Mar. 3, 2016

(30) Foreign Application Priority Data
Sep. 1, 2014    (RO) ...................... 14-0664

(51) Int. Cl.
G06F 9/45         (2006.01)
(52) U.S. Cl.
CPC .................................. G06F 8/4441 (2013.01)
(58) Field of Classification Search
None
See application file for complete search history.

(56) References Cited

U.S. PATENT DOCUMENTS

| | | | | |
|---|---|---|---|---|
| 6,061,772 A * | 5/2000 | Webber | ............... | G06F 13/1673 |
| | | | | 711/154 |
| 6,072,952 A * | 6/2000 | Janakiraman | ........... | G06F 8/443 |
| | | | | 717/155 |
| 6,141,791 A * | 10/2000 | Takuma | ............... | G06F 11/3664 |
| | | | | 712/227 |
| 6,427,234 B1 * | 7/2002 | Chambers | ........... | G06F 9/45516 |
| | | | | 717/140 |
| 6,760,743 B1 * | 7/2004 | Heddes | ................ | G06F 9/3802 |
| | | | | 709/201 |
| 6,877,150 B1 * | 4/2005 | Miller | ................ | G06F 17/5045 |
| | | | | 716/103 |
| 7,457,936 B2 * | 11/2008 | Huang | ...................... | G06F 8/41 |
| | | | | 711/217 |
| 8,234,636 B2 * | 7/2012 | Kawahito | ............... | G06F 8/443 |
| | | | | 717/151 |
| 8,392,669 B1 * | 3/2013 | Nyland | ................ | G06F 9/3851 |
| | | | | 711/154 |
| 8,527,975 B2 * | 9/2013 | Chess | ................ | G06F 11/3608 |
| | | | | 714/37 |
| 8,561,044 B2 * | 10/2013 | Chen | ..................... | G06F 8/4442 |
| | | | | 714/35 |
| 9,110,684 B2 * | 8/2015 | Archambault | ........ | G06F 8/4442 |
| 9,128,722 B2 * | 9/2015 | Betouin | .................. | G06F 8/423 |
| 2002/0144244 A1 * | 10/2002 | Krishnaiyer | .......... | G06F 8/4442 |
| | | | | 717/140 |
| 2003/0056041 A1 * | 3/2003 | Connor | ................... | H04L 69/16 |
| | | | | 710/58 |
| 2003/0163679 A1 * | 8/2003 | Ganapathy | .............. | G06F 9/381 |
| | | | | 712/241 |
| 2004/0088501 A1 * | 5/2004 | Collard | ................. | G06F 9/3824 |
| | | | | 711/154 |
| 2005/0044327 A1 * | 2/2005 | Howard | ................. | G06F 9/544 |
| | | | | 711/147 |
| 2009/0271775 A1 * | 10/2009 | Barsness | ............. | G06F 9/45516 |
| | | | | 717/151 |
| 2010/0325621 A1 * | 12/2010 | Andrade | ................ | G06F 8/433 |
| | | | | 717/156 |

OTHER PUBLICATIONS

Nieplocha et al., Title: ARMCI: A Portable Aggregate Remote Memory Copy Interface, Version 1.1, Oct. 30, 2000 Located at: http://hpc.pnl.gov/globalarrays/papers/armci1-1.pdf.*

(Continued)

*Primary Examiner* — Wei Zhen
*Assistant Examiner* — Hossain Morshed

(57) ABSTRACT

A method and apparatus for optimizing computer program code. The method comprises identifying at least one set of candidate instructions within the computer program code, each candidate instruction comprising an instruction for writing a constant value to memory and the at least one set comprising a plurality of candidate instructions. The method further comprises computing an aggregate constant value for the at least one set of candidate instructions, and replacing the at least one set of candidate instructions with at least one instruction for writing the aggregate constant value to memory.

14 Claims, 7 Drawing Sheets

(56) References Cited

OTHER PUBLICATIONS

Liao, Title: Storage Assignment to Decrease Code Size, ACM May 1996.*

Liao, Stan et al., "Storage Assignment to Decrease Code Size," ACM Transactions of Programming Languages and Systems, vol. 18, No. 3; May 1996, pp. 235-253.

* cited by examiner

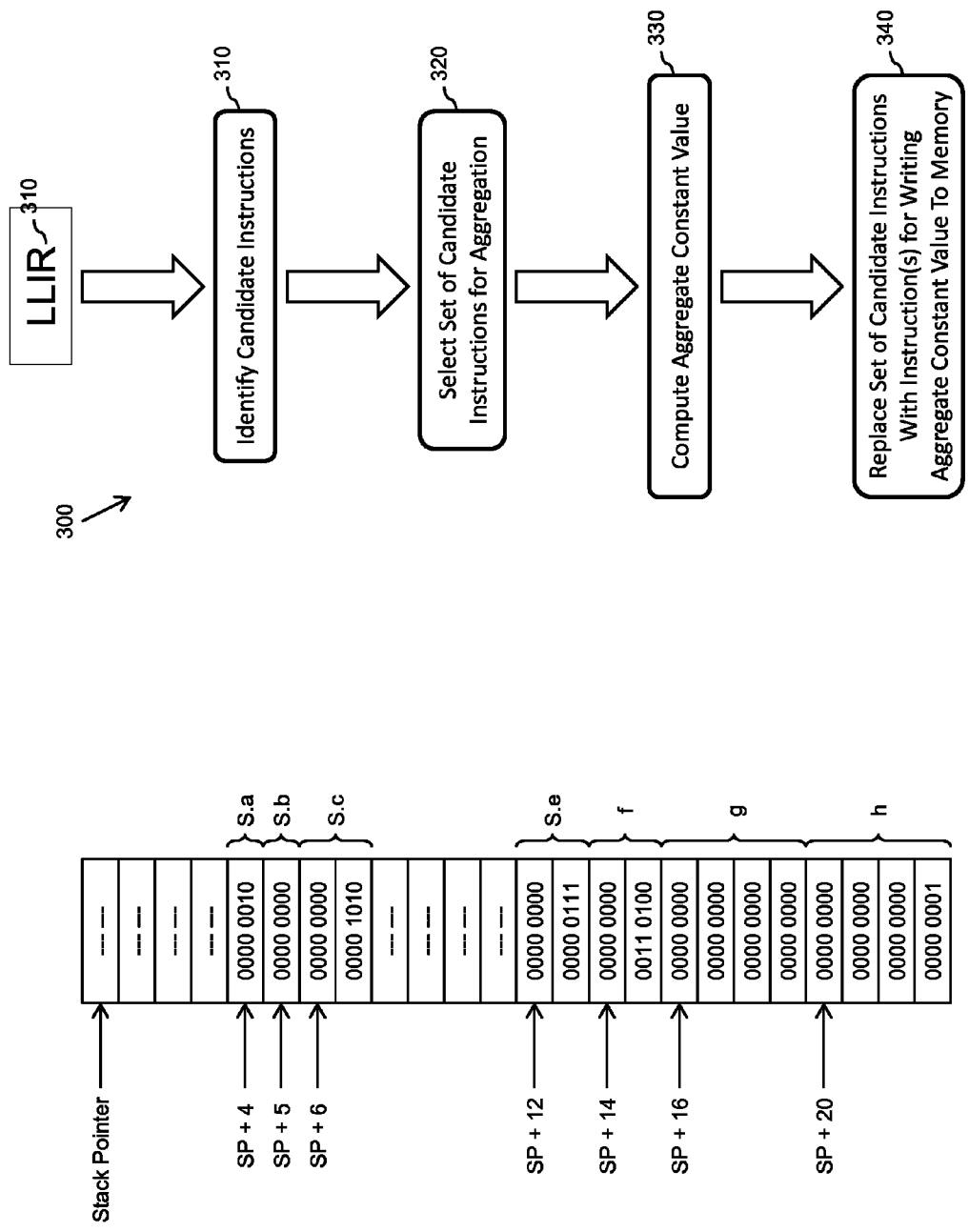

METHOD AND APPARATUS FOR OPTIMISING COMPUTER PROGRAM CODE

CROSS REFERENCE TO RELATED APPLICATION(S)

The present application claims priority to Romanian Patent Application No. RO A 2014 00664, entitled "METHOD AND APPARATUS FOR OPTIMISING COMPUTER PROGRAM CODE," filed on Sep. 1, 2014, the entirety of which is herein incorporated by reference.

FIELD OF THE INVENTION

This invention relates to a method of optimising computer program code, and an apparatus for performing such a method.

BACKGROUND OF THE INVENTION

There is a continual market demand for more size and speed efficient computer program code. Compiler optimisation is a transformation of code which tries to minimize or maximize some attributes of an executable computer program, most often to minimize execution time and memory space occupied by the resulting executable computer program code.

Initialisation code is used within embedded applications to configure and setup ports, physical addresses, etc. and typically involves the initialisation of local and/or global variables, including structures and classes, with constants. Conventionally, such initialisation usually results in multiple assignments of constants to variables in contiguous memory locations. Such multiple assignments of constants is often inefficient in terms of both code size and code speed.

Whilst this problem is particularly relevant in embedded applications, it is not limited to such applications.

SUMMARY OF THE INVENTION

The present invention provides method of optimising computer program code and computer program code optimisation apparatus as described in the accompanying claims.

Specific embodiments of the invention are set forth in the dependent claims.

These and other aspects of the invention will be apparent from and elucidated with reference to the embodiments described hereinafter.

BRIEF DESCRIPTION OF THE DRAWINGS

Further details, aspects and embodiments of the invention will be described, by way of example only, with reference to the drawings. In the drawings, like reference numbers are used to identify like or functionally similar elements. Elements in the figures are illustrated for simplicity and clarity and have not necessarily been drawn to scale.

FIG. 2 illustrates a simplified representation of locations within memory for initialised values relative to a stack pointer.

FIG. 3 illustrates a simplified flowchart of an example of a method of performing computer program code optimisation.

DETAILED DESCRIPTION OF THE PREFERRED EMBODIMENTS

The present invention will now be described with reference to the accompanying drawings in which there are illustrated example embodiments of the present invention. However, it will be appreciated that the present invention is not limited to the specific examples herein described and illustrated in the accompanying drawings.

Furthermore, because the illustrated embodiments of the present invention may for the most part, be implemented using electronic components and circuits known to those skilled in the art, details will not be explained in any greater extent than that considered necessary as illustrated below, for the understanding and appreciation of the underlying concepts of the present invention and in order not to obfuscate or distract from the teachings of the present invention.

Figure 1:
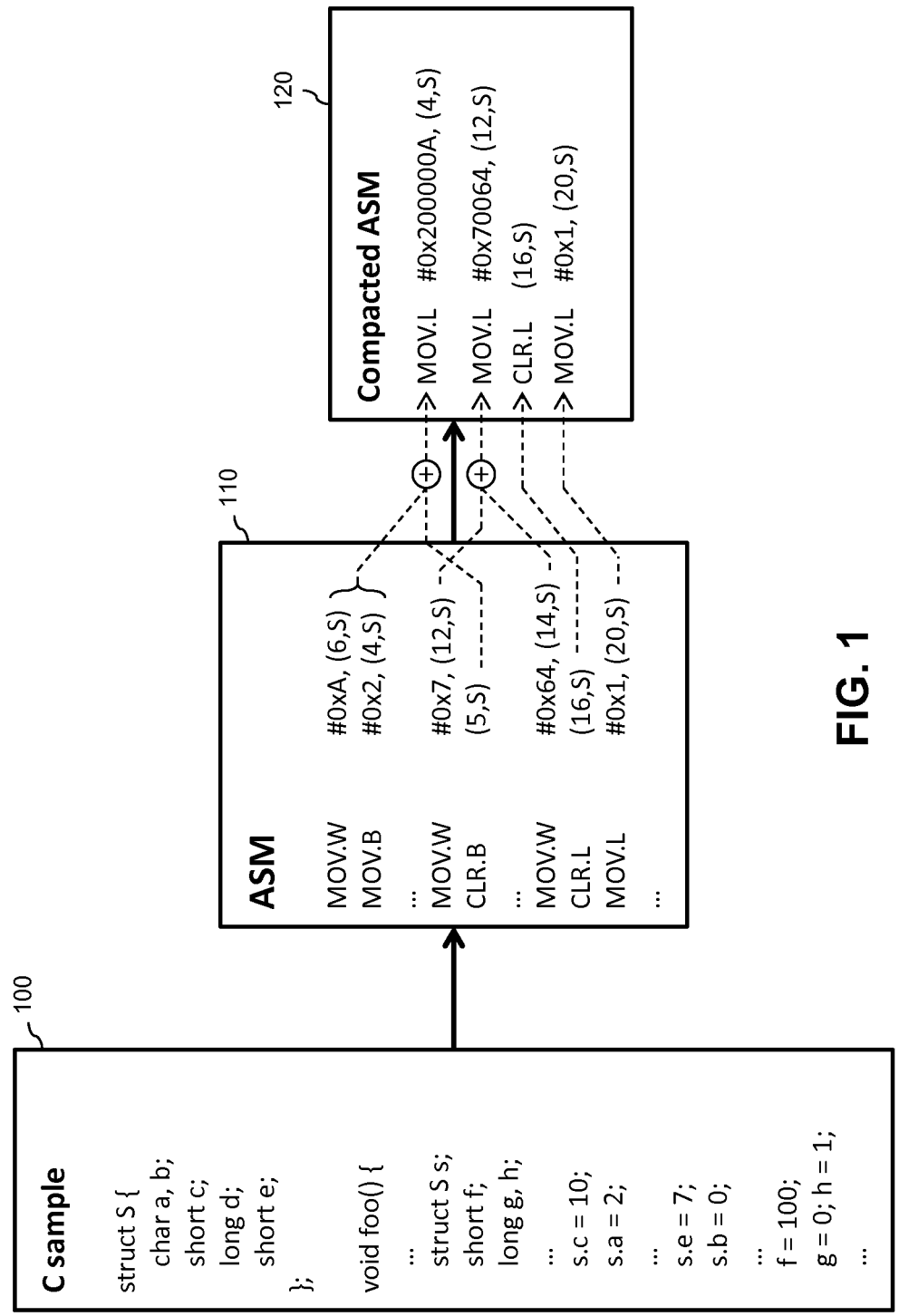
FIG. 1 illustrates a simplified block diagram of a first example of computer program code optimisation.

Referring first to FIG. 1, there is illustrated a simplified block diagram of a first example of computer program code optimisation. The example illustrated in FIG. 1 relates to computer program code intended for execution on CISC (complex instruction set computer) machines, with big endian byte ordering assumed. In the illustrated example, source code 100 for the computer program code defines a structure (struct S) comprising members (char a, char b, short c, long d, short e) that are initialised out of order. Furthermore, several local variables (short f, long g, long h) are also initialised along with the members of the structure (struct S). In the illustrated example, the following initialisations are shown:

member c of struct S: 10
member a of struct S: 2
member e of struct S: 7
member b of struct S: 0
variable f: 100
variable g: 0
variable h: 1

In total, these seven members/variables constitute 16 bytes of data, made up of three short data types, two char data types and two long data types.

In order to aid in the optimisation of the computer program code, it is known to translate source code into a low level intermediate language. In the example illustrated in FIG. 1, the source code 100 is translated into such a low level intermediate language 110, for example an assembly language corresponding to the intended CISC computer architecture on which the resulting executable program code is to be run.

Depending on the particular computer architecture, the storing of a 0 value may either be achieved using a CLR type instruction or a MOV instruction. In the illustrated example, it is assumed that all of the instructions use the same stack-indexed addressing mode, with the offset of the structure (struct S) and its first member being a four byte offset from the stack pointer (4, S) and the offset of the first local variable being a fourteen byte offset from the stack pointer (14, S). FIG. 2 illustrates a simplified representation of the locations within memory for the initialised values relative to a stack pointer. The above identified initialisations within the source code 100 have been translated into the following instructions within the low level intermediate language 110 respectively:

MOV.W #0xA, (6,S)
MOV.B #0x2, (4,S)
MOV.W #0x7, (12,S)
CLR.B (5,S)
MOV.W #0x64, (14,S)
CLR.L (16,S)
MOV.L #0x1, (20,S)

Conventionally, such low level intermediate language initialisation instructions would be translated substantially directly into executable program code instructions. As such, each structure member and variable would be initialised by way of an individual memory access, with the sizes of the memory accesses performed corresponding to the sizes of the respective variables: byte for char, Word (2x byte) for short and Long (4x byte) for long (and int). Thus for the structure members and variables in the illustrated example, seven memory accesses would be performed (one per instruction) in order to initialise just sixteen bytes of data. Such individual assignments of constants is inefficient in terms of both code size and code speed.

FIG. 3 illustrates a simplified flowchart 300 of an example of a method of performing computer program code optimisation, and in particular for optimising the assignment of constants to variables residing in nearby (e.g. contiguous) memory locations. The method illustrated in FIG. 3 starts at 310 with the receipt of (or otherwise obtaining) computer program code to be optimised. In the illustrated example the computer program code comprises a low level intermediate language such as the assembly language 110 of FIG. 1. Next, at 310, candidate instructions are identified within the received computer program code, the candidate instructions comprising instructions for writing constant values to memory. One or more sets of the identified candidate instructions are then selected at 320 for aggregation, for example as described in greater detail below. An aggregate constant value for the (or each) selected set of candidate instructions is then computed, at 330, and the (or each) selected set of candidate instructions may then be replaced with a more efficient instruction or set of instructions for writing the (or each) aggregate constant value to memory at 340, such as described in greater detail below.

In this manner, by computing an aggregate constant value for the set of candidate instructions, and replacing the set of candidate instructions with one or more instructions for writing the aggregate constant value to memory, the number of memory accesses used to write the constant values to memory may be reduced by using one or more instructions that access a larger block of memory per access. In this manner the number of memory accesses required for, say, assigning constants to variables etc. may be reduced, thereby achieving more efficient computer program code in terms of size and/or execution speed.

For example, and referring back to FIGS. 1 and 2, in the illustrated example three constant values for the members a, b and c of the structure struct S are required to be written to four contiguous bytes within memory. Within the initial, un-optimised low level intermediate language 110, three separate write instructions are used to individually write the three constant values to memory. Similarly, four further constant values for the member e of the structure struct S and variables f, g and h are required to be written to 12 contiguous bytes within memory. Within the initial, un-optimised low level intermediate language 110, four separate write instructions are used to individually write the four constant values to memory.

However, in accordance with some example embodiments, the three instructions used to individually write the three constant values for the members a, b and c of the structure struct S to memory may be selected to comprise a set of candidate instructions, and an aggregate constant value therefor computed. For example, the constant values to be written to memory by these three instructions are, in the order in which they are to be stored in memory: 0x2; 0x0; and 0xA. Accordingly, an aggregate constant value for these three instructions may be computed as:

0x 0200 000A

This aggregate constant value takes up four bytes within memory, the equivalent of a single long data type. As such, the three instructions used to individually write the three constant values for the members a, b and c of the structure struct S to memory in the initial low level intermediate language 110 may then be replaced by a single long data type write instruction in an optimised low level intermediate language 120 version of the computer program code. Thus, in the illustrated example, the three original instructions of:

MOV.W #0xA, (6,S)
MOV.B#0x2, (4,S)
CLR.B (5,S)

may be replaced by one single write instruction of:

MOV.L #0x200000A, (4,S)

Furthermore, the four instructions used to individually write the four constant values for the member e of the structure struct S and variables f, g and h to memory may additionally/alternatively be selected to comprise a set of candidate instructions, and an aggregate constant value therefor computed. For example, the constant values to be written to memory by these four instructions are, in the order in which they are to be stored in memory: 0x7; 0x64; 0x0; and 0x1. Accordingly, an aggregate constant value for these four instructions may be computed as:

0x 0007 0064 0000 0000 0000 0001

This aggregate constant value takes up twelve bytes within memory, the equivalent of three long data types. As such, the four instructions used to individually write the four constant values for member e of the structure struct S and variables f, g and h to memory in the initial low level intermediate language 110 may then be replaced by three long data type write instructions in the optimised low level intermediate language 120 version of the computer program code. Thus, in the illustrated example, the four original instructions of:

MOV.W #0x7, (12,S)
MOV.W #0x64, (14,S)
CLR.L (16,S)
MOV.L#0x1, (20,S)

may be replaced by three write instructions of:

MOV.L #0x70064, (12,S)
CLR.L (16,S)
MOV.L#0x1, (20,S)

It will be apparent that in this example the same may be achieved by disregarding long data type write instructions within the initial low level intermediate language computer program code as candidate instructions for aggregation, such as the instructions CLR.L (16,S) and MOV.L #0x1, (20,S), which are already optimum in terms of efficiency in writing data to memory, and thus have in this example remained unaltered.

Candidate instructions for aggregation may be identified based on any appropriate criteria. For example, instructions using a same addressing mode may be identified as candidate instructions, (in the illustrated example the instructions all use a stack-indexed addressing mode).

Having identified candidate instructions for aggregation, one or more sets of candidate instructions may then be selected based on any suitable criteria. For example, candidate instructions writing constant values to a single contiguous block of memory may be selected as a set of candidate instructions. In the illustrated example described above, two such sets of candidate instructions are apparent: the first set comprising the three instructions used to write the three constant values for the members a, b and c of the structure struct S to memory; and the second set comprising the four instructions used to write the member e of the structure struct S and variables f, g and h to memory.

In some examples, the validity of aggregating constant values for the (or each) set of candidate instructions may be checked. For example, the validity of aggregating candidate instructions within a set of candidate instructions may be determined by:

checking whether the candidate instructions comprise volatile operands;

checking whether accesses to memory occur between the candidate instructions within the computer program code;

checking whether registers used by the candidate instructions are modified between the candidate instructions within the computer program code.

If it is determined that one or more such condition(s) occur, invalidating the aggregation of the constant values for the candidate instructions, then the relevant set of candidate instructions may be altered in order to avoid the invalidating condition(s). For example, any instruction comprising a volatile operand may be disregarded as a candidate instruction, and the process of selected one or more sets of candidate instructions repeated. Additionally/alternatively, if an access to memory occurs between the candidate instructions within the computer program code. or a register used by the candidate instructions is modified between the candidate instructions within the computer program code, the set of candidate instructions may be divided into subsets at the point of such a condition occurring within the computer program code. The validity of aggregating constant values for the (or each) subset of candidate instructions may then be checked.

In some examples, the largest set (or sets) of candidate instructions for which a valid aggregate constant value is achievable is/are selected for computing the (or each) aggregate constant value.

Figure 4:
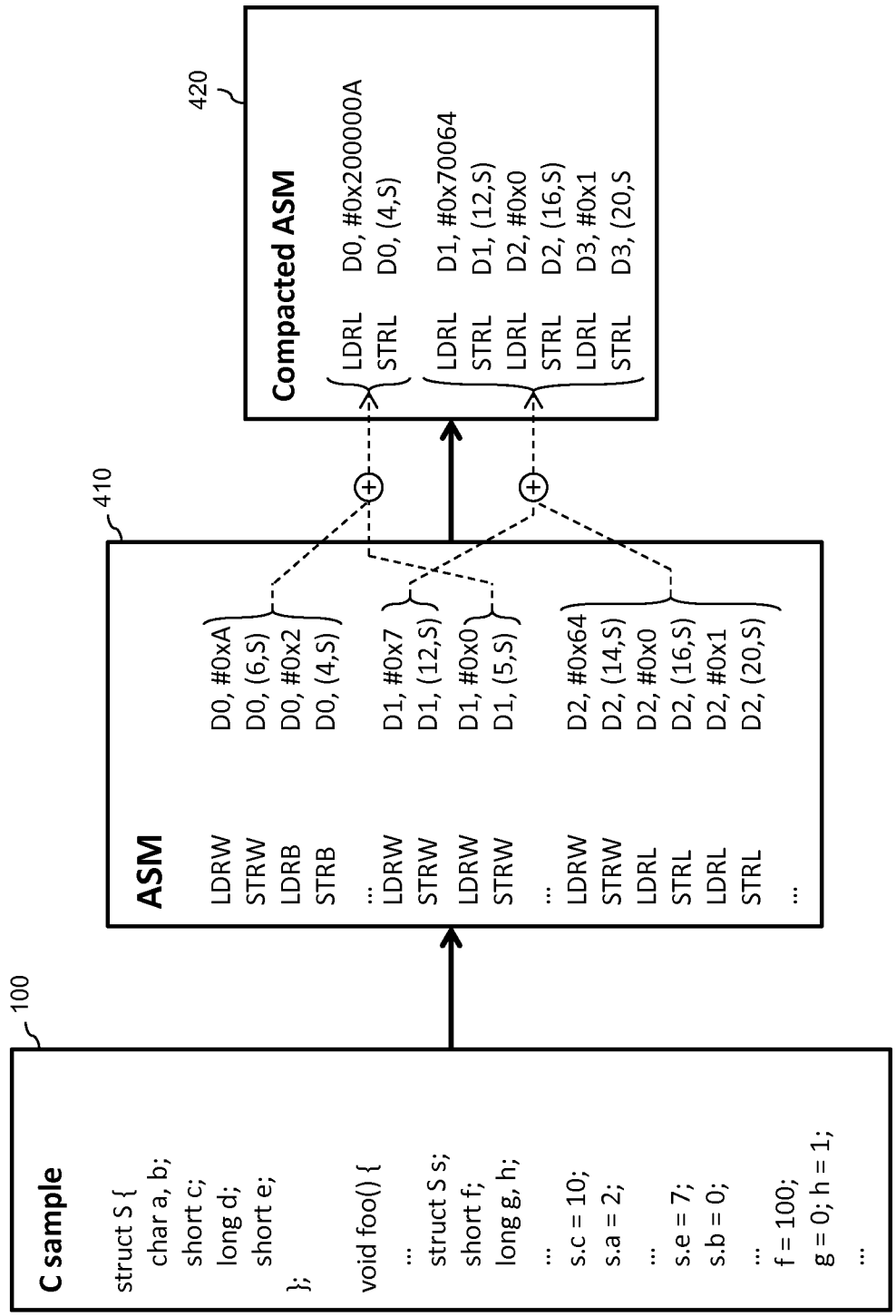
FIGS. 4 to 6 illustrate simplified block diagrams of further examples of computer program code optimisation.

The example illustrated in FIG. 1 relates to computer program code intended for execution on CISC machines. Referring now to FIG. 4 there is illustrated a simplified block diagram of a further example of computer program code optimisation. The example illustrated in FIG. 4 relates to computer program code intended for execution on RISC (reduced instruction set computer) machines, with big endian byte ordering assumed, and comprises optimisation of the same source code 100 as the example illustrated in FIG. 1. The source code 100 is translated into a low level intermediate language 410, for example an assembly language corresponding to the intended RISC computer architecture on which the resulting executable program code is to be run.

In this RISC example, each source code write instruction is translated into two low level intermediate language (or assembly) instructions: a load instruction and a store instruction. Again, in the illustrated example it is assumed that all of the instructions use the same stack-indexed addressing mode, with the offset of the structure (struct S) and its first member being a four byte offset from the stack pointer (4, S) and the offset of the first local variable being a fourteen byte offset from the stack pointer (14, S), as illustrated in FIG. 2. As can be seen from FIG. 4, the constant value initialisations within the source code 100 (identified above in relation to FIG. 1) have been translated into fourteen load and store instructions within the low level intermediate language 410.

Conventionally, such low level intermediate language initialisation instructions would be translated substantially directly into executable program code instructions. As such, each structure member and variable would be initialised by way of an individual load/store memory access, with the sizes of the memory accesses performed corresponding to the sizes of the respective variables: byte for char, Word (2x byte) for short and Long (4x byte) for long (and int). Thus for the structure members and variables in the illustrated example, seven load/store memory accesses would be performed (one per source code instruction) in order to initialise just sixteen bytes of data. Such individual assignments of constants is inefficient in terms of both code size and code speed.

However, in the example illustrated in FIG. 4, three pairs of load/store instructions used to individually write the three constant values for the members a, b and c of the structure struct S to memory may be selected to comprise a set of candidate instructions, and an aggregate constant value therefor computed. For example, the constant values to be written to memory by these three pairs of load/store instructions are, in the order in which they are to be stored in memory: 0x2; 0x0; and 0xA. Accordingly, an aggregate constant value for these three pairs of load/store instructions may be computed as:

0x 0200 000A

This aggregate constant value takes up four bytes within memory, the equivalent of a single long data type. As such, the three pairs of load/store instructions used to individually write the three constant values for the members a, b and c of the structure struct S to memory in the initial low level intermediate language 410 may then be replaced by a single long data type load/store instruction pair in an optimised low level intermediate language 420 version of the computer program code. Thus, in the illustrated example, the three original pairs of load/store instructions of:

LDRW D0, #0xA
STRW D0, (6,S)
LDRB D0, #0x2
STRB D0, (4,S)
LDRW D1, #0x0
STRW D1, (5,S)

may be replaced by one signal load/store instruction pair of:

LDRL D0, #0x200000A
STRL D0, (4,S)

Furthermore, the four pairs of load/store instructions used to individually write the four constant values for the member e of the structure struct S and variables f, g and h to memory may additionally/alternatively be selected to comprise a set of candidate instructions, and an aggregate constant value therefor computed. For example, the constant values to be written to memory by these four pairs of load/store instructions are, in the order in which they are to be stored in memory: 0x7; 0x64; 0x0; and 0x1. Accordingly, an aggregate constant value for these four pairs of load/store instructions may be computed as:

0x 0007 0064 0000 0000 0000 0001

This aggregate constant value takes up twelve bytes within memory, the equivalent of three long data types. As such, the four pairs of load/store instructions used to individually write the four constant values for member e of the structure struct S and variables f, g and h to memory in the initial low level intermediate language 410 may then be replaced by three long data type pairs of load/store instructions in the optimised low level intermediate language 420 version of the computer program code. Thus, in the illustrated example, the four original pairs of load/store instructions of:

LDRW D1, #0x7
STRW D1, (12,S)
LDRW D2, #0x64
STRW D2, (14,S)
LDRL D2, #0x0
STRL D2, (16,S)
LDRL D2, #0x1
STRL D2, (20,S)

may be replaced by three pairs of load/store instructions of:

LDRL D1, #0x70064
STRL D1, (12,S)
LDRL D2, #0x0
STRL D2, (16,S)
LDRL D3, #0x1
STRL D3, (20,S)

In the examples illustrated in FIGS. 1 and 4, the candidate instructions within the initial low level intermediate language 110, 410 are directly replaced with more efficient instructions for writing the aggregate constant value(s) to memory. In some alternative examples, candidate instructions may additionally/alternatively be replaced with one or more library copy routine(s) for copying the aggregate constant value(s) to memory from a data section within an object file.

Figure 5:
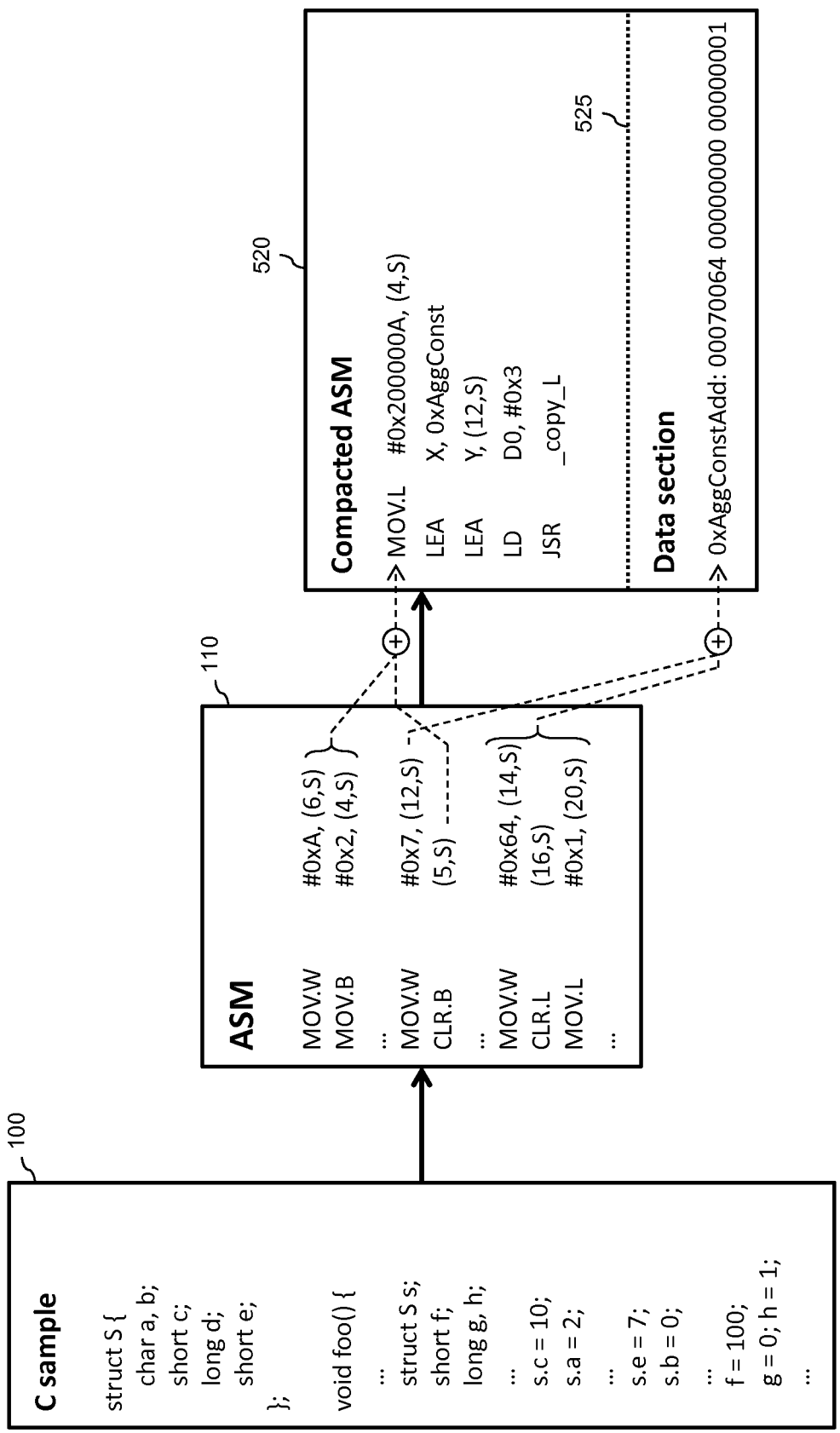

FIG. 5 illustrates a simplified block diagram of a further example of computer program code optimisation in which candidate instructions are replaced with a library copy routine for copying aggregate constant value(s) to memory from a data section within an object file. The example illustrated in FIG. 5 relates to computer program code intended for execution on CISC machines, with big endian byte ordering assumed, and comprises optimisation of the same source code 100 and low level intermediate language code 110 as the example illustrated in FIG. 1.

In the same manner as for the example illustrated in FIG. 1, the three instructions used to individually write the three constant values for the members a, b and c of the structure struct S to memory may be selected to comprise a set of candidate instructions, and an aggregate constant value therefor computed. For example, the constant values to be written to memory by these three instructions are, in the order in which they are to be stored in memory: 0x2; 0x0; and 0xA. Accordingly, an aggregate constant value for these three instructions may be computed as:

0x 0200 000A

This aggregate constant value takes up four bytes within memory, the equivalent of a single long data type. As such, the three instructions used to individually write the three constant values for the members a, b and c of the structure struct S to memory in the initial low level intermediate language 110 may then be replaced by a single long data type write instruction in an optimised low level intermediate language 120 version of the computer program code. Thus, in the illustrated example, the three original instructions of:

MOV.W #0xA, (6,S)
MOV.B #0x2, (4,S)
CLR.B (5,S)

may be directly replaced by one single write instruction within an optimised low level intermediate language code 520 of:

MOV.L #0x200000A, (4,S)

As described above in relation to FIG. 1, an aggregate constant value for the four instructions used to individually write the four constant values for the member e of the structure struct S and variables f, g and h to memory may be computed as:

0x 0007 0064 0000 0000 0000 0001

In the example illustrated in FIG. 5, this aggregate constant value is stored within a data section 525 of an object file (such object file may comprise the same object file as the resulting executable program code or a separate object file). The four instructions used to individually write the four constant values for the member e of the structure struct S and variables f, g and h to memory are the replaced within the optimised low level intermediate language code 520 by the instructions:

LEA X, 0xAggConstAdd
LEA Y, (12,S)
LD D0, #0x3
JSR _copy_L

These new instructions perform the actions respectively of: load the address in memory of the aggregate constant value within the data section 525 ("0xAggConstAdd"); load the address in memory to which the aggregate constant value is to be written/copied ("(12,S)"—i.e. 12 byte offset from the stack pointer); load the size of the constant in ("#0x3"—i.e. 3x 4—byte chunks); and call the library routine ("_copy_L") for copying the aggregate constant value to memory.

Figure 6:
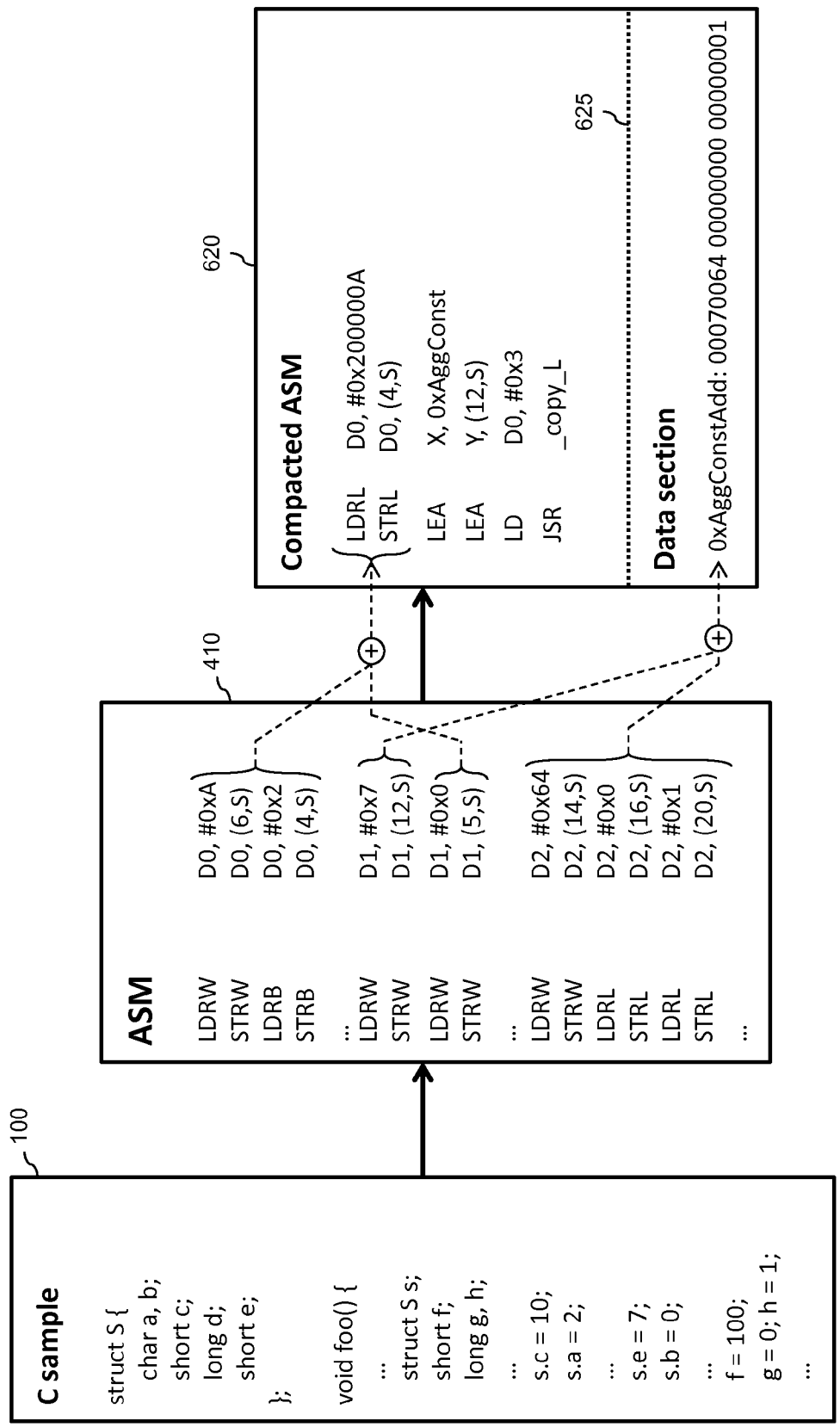

FIG. 6 illustrates a simplified block diagram of a still further example of computer program code optimisation in which candidate instructions are replaced with a library copy routine for copying aggregate constant value(s) to memory from a data section within an object file. The example illustrated in FIG. 6 relates to a computer program code intended for execution on RISC machines, with big endian byte ordering assumed, and comprises optimisation of the same source code 100 and low level intermediate language code 410 as the example illustrated in FIG. 4.

In the same manner as for the example illustrated in FIG. 4, the three pairs of instructions used to individually write the three constant values for the members a, b and c of the structure struct S to memory may be selected to comprise a set of candidate instructions, and an aggregate constant value therefor computed. For example, the constant values to be written to memory by these three pairs of load/store instructions are, in the order in which they are to be stored in memory: 0x2; 0x0; and 0xA. Accordingly, an aggregate constant value for these three pairs of load/store instructions may be computed as:

0x 0200 000A

This aggregate constant value takes up four bytes within memory, the equivalent of a single long data type. As such, the three pairs of load/store instructions used to individually write the three constant values for the members a, b and c of the structure struct S to memory in the initial low level intermediate language 410 may then be replaced by a single long data type load/store instruction pair in an optimised low level intermediate language 520 version of the computer program code. Thus, in the illustrated example, the three original pairs of load/store instructions of:

LDRW D0, #0xA
STRW D0, (6,S)
LDRB D0, #0x2

STRB D0, (4,S)
LDRW D1, #0x0
STRW D1, (5,S)

may be replaced by one signal load/store instruction pair of:

LDRL D0, #0x200000A
STRL D0, (4,S)

As described above in relation to FIG. 4, an aggregate constant value for the four pairs of load/store instructions used to individually write the four constant values for the member e of the structure struct S and variables f, g and h to memory may be computed as:

0x 0007 0064 0000 0000 0000 0001

In the example illustrated in FIG. 6, this aggregate constant value is stored within a data section 625 of an object file (such object file may comprise the same object file as the resulting executable program code or a separate object file). The four pairs of load/store instructions used to individually write the four constant values for the member e of the structure struct S and variables f, g and h to memory are then replace within the optimised low level intermediate language code 620 by the instructions:

LEA X, 0xAggConstAdd
LEA Y, (12,S)
LD D0, #0x3
JSR _copy_L

These new instructions perform the actions respectively of: load the address in memory of the aggregate constant value within the data section 525 ("0xAggConstAdd"); load the address in memory to which the aggregate constant value is to be written/copied ("(12,S)"—i.e. 12 byte offset from the stack pointer); load the size of the constant in ("#0x 3"—i.e. 3x 4-byte chunks); and call the library routine ("_copy_L") for copying the aggregate constant value to memory.

As will be apparent to a person skilled in the art, the various examples herein described and illustrated in the accompanying drawings enable the problem of multiple assignments of constants to variables, which are inefficient when the variables residing in consecutive memory locations are of sizes smaller than the largest addressable memory access, to be substantially alleviated by enabling larger and therefore more efficient aggregate constant values to memory. In particular, the number of memory accesses may be reduced by accessing more memory with each instruction.

Figure 7:
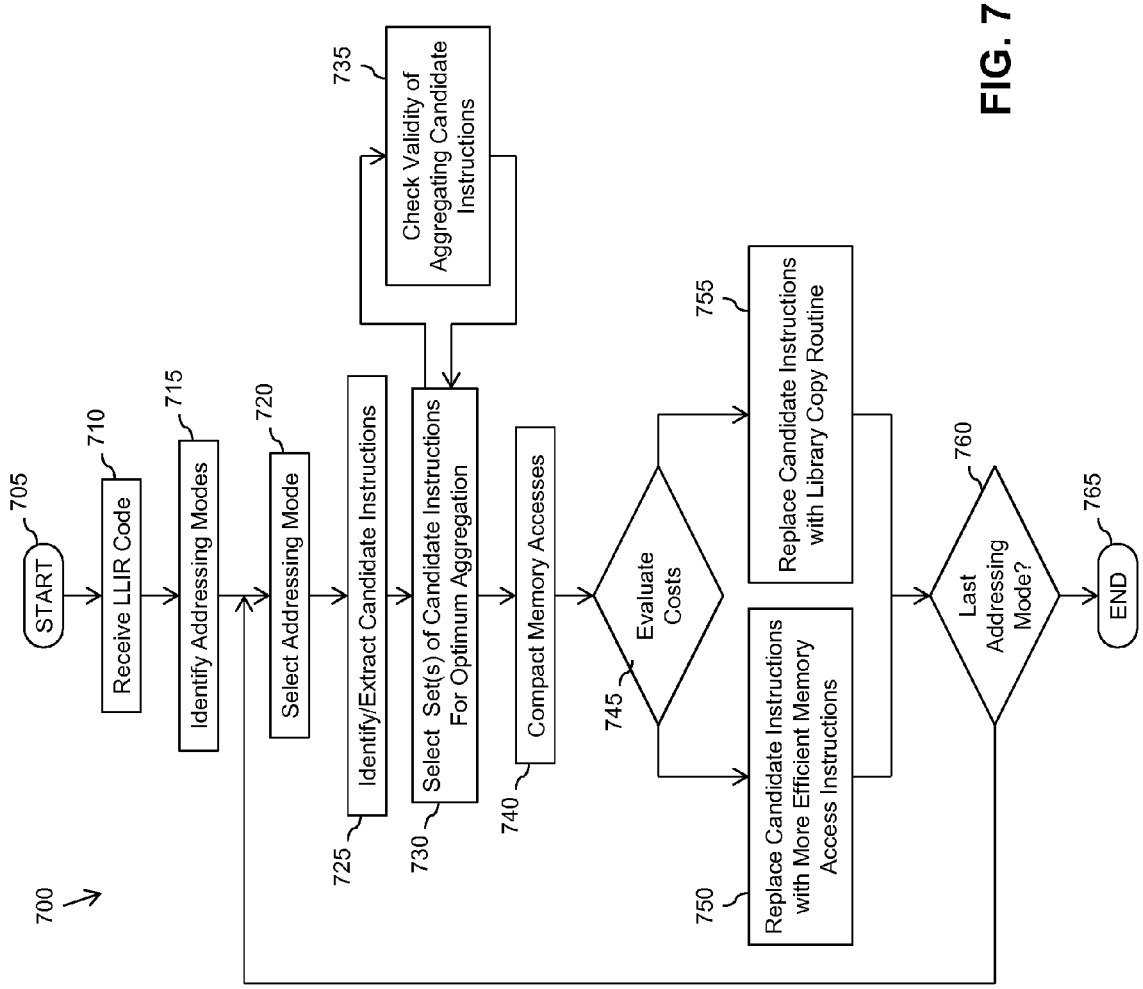
FIG. 7 illustrates a simplified flowchart of a further example of optimising computer program code.

Referring now to FIG. 7, there is illustrated a simplified flowchart 700 of a further example of optimising computer program code. The method starts at 705 and moves on to 710 where computer program code to be optimised is received. In the illustrated example the computer program code to be optimised comprises low level intermediate code. Next, at 715, in the illustrated example addressing modes used within the computer program code are identified, and in particular addressing modes used by instructions that write constant values to memory. The method then moves on to 720 where a (first) addressing mode is selected. Candidate instructions using the selected addressing mode for writing constant values to memory are then identified/extracted at 715. One or more set(s) of candidate instructions are then selected at 730, and in particular for the illustrated example one or more set(s) of candidate instructions are selected to achieve optimum aggregation. For example, and as described above, candidate instructions writing constant values to a single contiguous block of memory may be selected as a set of candidate instructions. The validity of aggregating candidate instructions within the (or each) selected set is checked at 735. For example, the validity of aggregating candidate instructions within a set of candidate instructions may be determined by:

checking whether the candidate instructions comprise volatile operands;
checking whether accesses to memory occur between the candidate instructions within the computer program code;
checking whether registers used by the candidate instructions are modified between the candidate instructions within the computer program code.

Steps 730 and 735 may be repeated until one or more set(s) of candidate instructions for which the aggregation of the respective candidate instructions has been validated. Having selected one or more set(s) of candidate instructions for which the aggregation of the respective candidate instructions has been validated, the method moves on to 740 where compaction of the memory accesses for the (or each) set of candidate instructions is performed. Such compaction comprises, for example, computing an aggregate constant value for the (or each) set of candidate instructions and a base address at which the aggregate constant value is to be stored in memory is determined.

In the illustrated example, the method then comprises evaluating one or more efficiency metric(s) for each of the instructions replacement options of:

(i) replacing the set(s) of candidate instructions substantially directly with more efficient write instruction(s) for writing the aggregate constant value(s) to memory (such as performed in the examples illustrated in FIGS. 1 and 4); and (ii) replacing the set(s) of candidate instructions with one or more library copy routine(s) for copying the aggregate constant value from a data section within an object file to memory (such is performed in the examples illustrated in FIGS. 5 and 6).

Such an efficiency metric may comprise, say, code execution speed, code size, etc. for each option, and the evaluation of such efficiency metric(s) may depend on the particular optimisation requirements for the target application of the computer program code. For example, replacing a set of candidate instructions substantially directly with more efficient write instruction(s) as performed in the first replacement option will typically result in a more efficient approach in terms of execution speed since both replacement options perform similar memory accesses but the second option has the library copy function call overhead. However, the second replacement option using library copy routine(s), can be more efficient than the first approach in terms of code size if the number of aggregated instructions is above a certain threshold, and/or where multiple sets of candidate instructions are being replaced such that the library copy routine is called multiple times.

Referring back to FIG. 7, having evaluated the costs (efficiency metrics) at 745, the (or each) set of candidate instructions is then replaced in accordance with the replacement approach deemed most appropriate, at 750/755. It is contemplated that different replacement approaches may be implemented for different sets of candidate instructions within the computer program code if such a combination of replacement approaches is determined to achieve the optimum balance between code size and execution speed.

In the illustrated example, having optimised the computer program code by replacing candidate instructions using the currently selected addressing mode, the method then determines whether aggregation of write instructions has been performed for all addressing modes within the computer program code, at 760. If it is determined that aggregation of write instructions has been performed for all addressing modes within the computer program code, the method ends at 765. Conversely, if it is determined that aggregation of write instructions has not been performed for all addressing modes within the computer program code, the method loops back to 720 where a next addressing mode is selected.

Figure 8:
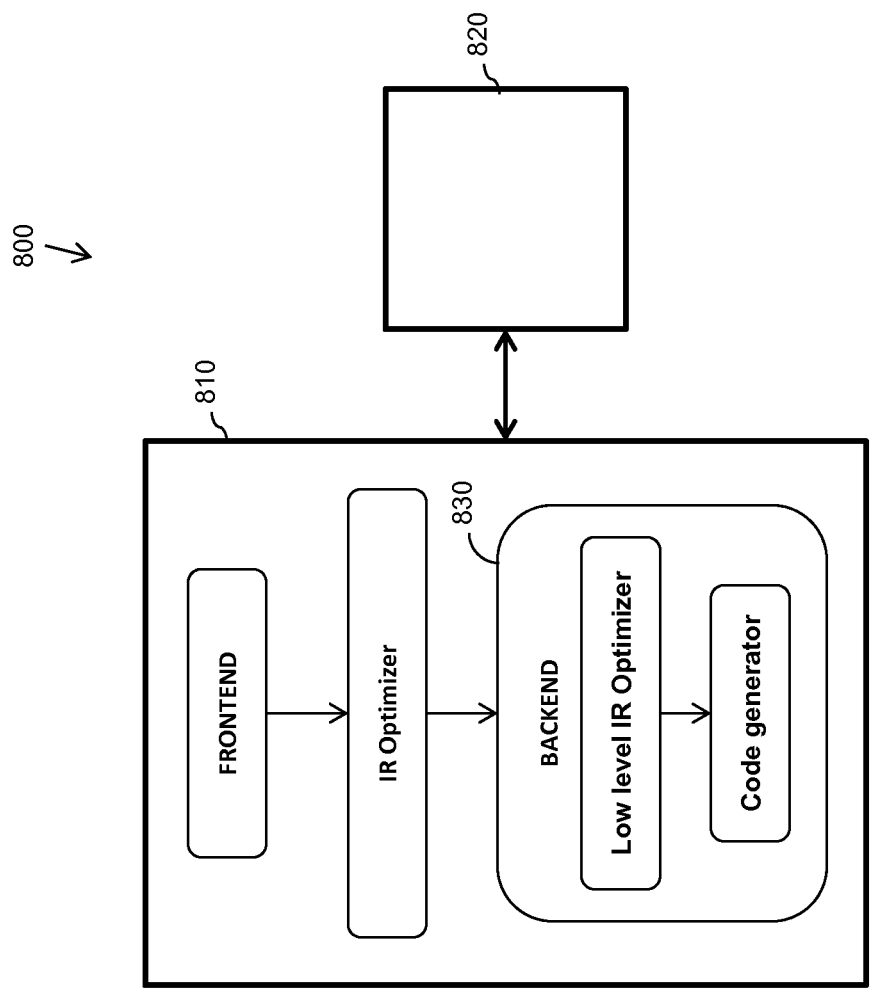
FIG. 8 illustrates a simplified block diagram of an example of a computer program code optimisation apparatus.

Referring now to FIG. 8, there is illustrated a simplified block diagram of an example of a computer program code optimisation apparatus 800 comprising at least one processing component 810 arranged to optimise computer program code, for example as hereinbefore described with reference to FIGS. 1 to 7. In some examples, the at least one processing component 810 is arranged to identify candidate instructions within the computer program code, each candidate instruction comprising an instruction for writing a constant value to memory, select at least one set of candidate instructions, the at least one set comprising a plurality of candidate instructions, compute an aggregate constant value for the at least one set of candidate instructions, and replace the at least one set of candidate instructions with at least one instruction for writing the aggregate constant value to memory.

In some examples, the (or each) processing component 810 may comprise a central processing unit, digital signal processor unit, microcontroller unit, microprocessor unit, or the like, and may be operably coupled to one or more memory elements, such as memory element 820, in which computer program code is stored. In particular, the memory element 820 may have executable program code stored therein for execution by the (or each) processing core 810 for optimising computer program code, the program code operable for identifying candidate instructions within the computer program code, each candidate instruction comprising an instruction for writing a constant value to memory selecting at least one set of candidate instructions, the at least one set comprising a plurality of candidate instructions, computing an aggregate constant value for the at least one set of candidate instructions, and replacing the at least one set of candidate instructions with at least one instruction for writing the aggregate constant value to memory. In the illustrated example, such program code comprises compiler backend program code 830 arranged to perform such computer program code optimisation of low level intermediate program code.

The invention may also be implemented in a computer program for running on a computer system, at least including code portions for performing steps of a method according to the invention when run on a programmable apparatus, such as a computer system or enabling a programmable apparatus to perform functions of a device or system according to the invention.

A computer program is a list of instructions such as a particular application program and/or an operating system. The computer program may for instance include one or more of: a subroutine, a function, a procedure, an object method, an object implementation, an executable application, an applet, a servlet, a source code, an object code, a shared library/dynamic load library and/or other sequence of instructions designed for execution on a computer system.

The computer program may be stored internally on a tangible and non-transitory computer readable storage medium or transmitted to the computer system via a computer readable transmission medium. All or some of the computer program may be provided on computer readable media permanently, removably or remotely coupled to an information processing system. The tangible and non-transitory computer readable media may include, for example and without limitation, any number of the following: magnetic storage media including disk and tape storage media; optical storage media such as compact disk media (e.g., CD-ROM, CD-R, etc.) and digital video disk storage media; non-volatile memory storage media including semiconductor-based memory units such as FLASH memory, EEPROM, EPROM, ROM; ferromagnetic digital memories; MRAM; volatile storage media including registers, buffers or caches, main memory, RAM, etc.

A computer process typically includes an executing (running) program or portion of a program, current program values and state information, and the resources used by the operating system to manage the execution of the process. An operating system (OS) is the software that manages the sharing of the resources of a computer and provides programmers with an interface used to access those resources. An operating system processes system data and user input, and responds by allocating and managing tasks and internal system resources as a service to users and programs of the system.

The computer system may for instance include at least one processing unit, associated memory and a number of input/output (I/O) devices. When executing the computer program, the computer system processes information according to the computer program and produces resultant output information via I/O devices.

In the foregoing specification, the invention has been described with reference to specific examples of embodiments of the invention. It will, however, be evident that various modifications and changes may be made therein without departing from the scope of the invention as set forth in the appended claims and that the claims are not limited to the specific examples described above.

Those skilled in the art will recognize that the boundaries between logic blocks are merely illustrative and that alternative embodiments may merge logic blocks or circuit elements or impose an alternate decomposition of functionality upon various logic blocks or circuit elements. Thus, it is to be understood that the architectures depicted herein are merely exemplary, and that in fact many other architectures can be implemented which achieve the same functionality.

Any arrangement of components to achieve the same functionality is effectively 'associated' such that the desired functionality is achieved. Hence, any two components herein combined to achieve a particular functionality can be seen as 'associated with' each other such that the desired functionality is achieved, irrespective of architectures or intermediary components. Likewise, any two components so associated can also be viewed as being 'operably connected,' or 'operably coupled,' to each other to achieve the desired functionality.

Furthermore, those skilled in the art will recognize that boundaries between the above described operations merely illustrative. The multiple operations may be combined into a single operation, a single operation may be distributed in additional operations and operations may be executed at least partially overlapping in time. Moreover, alternative embodiments may include multiple instances of a particular operation, and the order of operations may be altered in various other embodiments.

However, other modifications, variations and alternatives are also possible. The specifications and drawings are, accordingly, to be regarded in an illustrative rather than in a restrictive sense.

In the claims, any reference signs placed between parentheses shall not be construed as limiting the claim. The word 'comprising' does not exclude the presence of other elements or steps then those listed in a claim. Furthermore, the terms 'a' or 'an,' as used herein, are defined as one or more than one. Also, the use of introductory phrases such as 'at least one' and 'one or more' in the claims should not be construed to imply that the introduction of another claim element by the indefinite articles 'a' or 'an' limits any particular claim containing such introduced claim element to inventions containing only one such element, even when the same claim includes the introductory phrases 'one or more' or 'at least one' and indefinite articles such as 'a' or 'an.' The same holds true for the use of definite articles. Unless stated otherwise, terms such as 'first' and 'second' are used to arbitrarily distinguish between the elements such terms describe. Thus, these terms are not necessarily intended to indicate temporal or other prioritization of such elements. The mere fact that certain measures are recited in mutually different claims does not indicate that a combination of these measures cannot be used to advantage.

The invention claimed is:

1. A method of optimising computer program code, the method comprising:
   identifying at least one set of candidate instructions within the computer program code, each candidate instruction comprising an instruction for writing a constant value to memory and the at least one set comprising a plurality of candidate instructions;
   checking the validity of aggregating candidate instructions by checking whether the candidate instructions have volatile operands: computing an aggregate constant value for the at least one set of candidate instructions in response to the candidate instructions not having volatile operands; and replacing the at least one set of candidate instructions with at least one instruction for writing the aggregate constant value to memory.

2. The method of claim 1, wherein the computer program code comprises low level intermediate language computer program code.

3. The method of claim 2, wherein the method comprises identifying candidate instructions using a same hardware architecture addressing mode.

4. The method of claim 1, wherein the method comprises identifying candidate instructions using a same hardware architecture addressing mode.

5. The method of claim 1, wherein the at least one set of candidate instructions comprises instructions that write constant values to a single contiguous block of memory.

6. The method of claim 1, wherein the method further comprises checking
   whether registers used by the instructions are modified between the candidate instructions within the computer program code.

7. The method of claim 6, wherein the method comprises selecting as the at least one set of candidate instructions for which to compute an aggregate constant value the largest set of candidate instructions for which a valid aggregate constant value is achievable.

8. The method of claim 1, wherein the method comprises selecting as the at least one set of candidate instructions for which to compute an aggregate constant value the largest set of candidate instructions for which a valid aggregate constant value is achievable.

9. The method of claim 1, wherein replacing the at least one set of candidate instructions with at least one instruction for writing the aggregate constant value to memory comprises:
   replacing the at least one set of candidate instructions with at least one library copy routine for copying the aggregate constant value to memory from a data section within an object file.

10. The method of claim 9, wherein the method comprises:
    evaluating at least one efficiency metric for each of the instructions replacement options of: (i) replacing the at least one set of candidate instructions with at least one more efficient write instruction for writing the aggregate constant value to memory, and (ii) replacing the at least one set of candidate instructions with at least one library copy routine for copying the aggregate constant value from a data section within an object file to memory; and
    implementing one of the instruction replacement options based at least partly on the efficiency metric evaluation.

11. The method of claim 10, wherein the at least one efficiency metric comprises at least one of:
    code size; and
    code execution speed.

12. A computer program code optimisation apparatus comprising at least one processor arranged to optimise computer program code;
    wherein the at least one processing component is arranged to:
    identify candidate instructions within the computer program code, each candidate instruction comprising an instruction for writing a constant value to memory;
    check the validity of aggregating candidate instructions by checking whether the candidate instructions have volatile operands;
    select at least one set of candidate instructions comprising a plurality of candidate instructions, in response to the candidate instruction not having volatile operands;
    compute an aggregate constant value for the at least one set of candidate instructions; and replace the at least one set of candidate instructions with at least one instruction for writing the aggregate constant value to memory.

13. A non-transitory computer program product having executable program code stored therein for optimising computer program code, the program code operable for:
    identifying candidate instructions within the computer program code, each candidate instruction comprising an instruction for writing a constant value to memory;
    checking the validity of aggregating candidate instructions by checking whether the candidate instructions have volatile operands;
    selecting at least one set of candidate instructions comprising a plurality of candidate instructions, in response to the candidate instruction not having volatile operands;
    computing an aggregate constant value for the at least one set of candidate instructions; and
    replacing the at least one set of candidate instructions with at least one instruction for writing the aggregate constant value to memory.

14. The non-transitory computer program product of claim 13, wherein the non-transitory computer program product comprises at least one from a group including: a hard disk, a CD-ROM, an optical storage device, a magnetic storage device, a Read Only Memory (ROM) a Programmable Read Only Memory (PROM) an Erasable Programmable Read Only Memory (EPROM) an Electrically Erasable Programmable Read Only Memory (EEPROM) and a Flash memory.

\* \* \* \* \*